(12) United States Patent
Ishihara et al.

(10) Patent No.: US 11,770,517 B2
(45) Date of Patent: Sep. 26, 2023

(54) INFORMATION PROCESSING APPARATUS AND INFORMATION PROCESSING METHOD

(71) Applicant: SONY GROUP CORPORATION, Tokyo (JP)

(72) Inventors: Yasuko Ishihara, Tokyo (JP); Hirotake Ichikawa, Tokyo (JP); Atsushi Ishihara, Tokyo (JP); Hajime Wakabayashi, Tokyo (JP); Takaomi Kimura, Tokyo (JP); Masayuki Inoue, Tokyo (JP); Hidenori Aoki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/770,444

(22) PCT Filed: Oct. 14, 2020

(86) PCT No.: PCT/JP2020/038735
§ 371 (c)(1),
(2) Date: Apr. 20, 2022

(87) PCT Pub. No.: WO2021/085130
PCT Pub. Date: May 6, 2021

(65) Prior Publication Data
US 2022/0377313 A1 Nov. 24, 2022

(30) Foreign Application Priority Data
Oct. 28, 2019 (JP) .................. 2019-194910

(51) Int. Cl.
*H04N 13/349* (2018.01)
*H04N 13/344* (2018.01)
*G06F 3/01* (2006.01)

(52) U.S. Cl.
CPC .......... *H04N 13/349* (2018.05); *G06F 3/013* (2013.01); *H04N 13/344* (2018.05)

(58) Field of Classification Search
CPC .......... G06F 3/013; G06F 3/012; G06F 3/011; A63F 13/55; A63F 13/52; A63F 13/65;
(Continued)

(56) References Cited

U.S. PATENT DOCUMENTS 8,660,402 B2 * 2/2014 Newton ............... H04N 13/139
386/241
8,760,396 B2 * 6/2014 Kim ....................... G02B 30/27
345/6

(Continued)

FOREIGN PATENT DOCUMENTS

CN 109416842 A 3/2019
JP 2002-247602 A 8/2002
(Continued)

OTHER PUBLICATIONS

International Search Report and Written Opinion of PCT Application No. PCT/JP2020/038735, dated Dec. 8, 2020, 08 pages of ISRWO.

*Primary Examiner* — Vinh T Lam
(74) *Attorney, Agent, or Firm* — CHIP LAW GROUP

(57) ABSTRACT

Natural appearance of transition from a predetermined object of two-dimensional content displayed on a two-dimensional display to a three-dimensional display model of an AR display device or vice versa is achieved. Control is performed such that the transition is performed after switching the two-dimensional content from the motion parallax non-application display to the motion parallax application display. For example, control is performed such that the motion parallax application display is displayed on the two-dimensional display in a case where there is one AR display device, and the motion parallax application display (Continued)

is displayed on the AR display device in a case where there is a plurality of AR display devices.

13 Claims, 16 Drawing Sheets

(58) Field of Classification Search
CPC ........ A63F 13/428; A63F 13/35; G06T 19/00; H04N 13/349; H04N 13/344; H04N 13/359; G09G 5/36; G09G 5/00
See application file for complete search history.

(56) References Cited

U.S. PATENT DOCUMENTS

| | | | | |
|---|---|---|---|---|
| 8,988,496 | B2* | 3/2015 | Maeda | H04N 13/398 |
| | | | | 348/43 |
| 9,060,170 | B2* | 6/2015 | Shikata | H04N 13/204 |
| 9,196,072 | B2* | 11/2015 | Oh | G06T 13/40 |
| 9,219,904 | B2* | 12/2015 | Newton | G11B 20/10527 |
| 9,317,971 | B2* | 4/2016 | Lamb | G09G 3/003 |
| 9,338,428 | B2* | 5/2016 | Newton | H04N 13/189 |
| 9,509,985 | B2* | 11/2016 | Maeda | H04N 13/359 |
| 9,805,490 | B2* | 10/2017 | Oh | G06T 19/006 |
| 9,830,735 | B2* | 11/2017 | Koike | G06T 19/20 |
| 9,924,154 | B2* | 3/2018 | Newton | H04N 13/183 |
| 10,080,013 | B2* | 9/2018 | Shikata | H04N 13/302 |
| | | | | 348/42 |
| 10,163,261 | B2* | 12/2018 | Bell | G06T 19/003 |
| 10,204,436 | B2* | 2/2019 | Oh | G06T 19/20 |
| 10,419,740 | B2* | 9/2019 | Newton | H04N 13/178 |
| 10,462,406 | B2* | 10/2019 | Igarashi | G06T 7/579 |
| 10,481,678 | B2* | 11/2019 | Crispin | G06T 3/0031 |
| 10,499,044 | B1 | 12/2019 | Giokaris et al. | |
| 10,567,742 | B2* | 2/2020 | King | H04N 13/341 |
| 10,593,042 | B1* | 3/2020 | Douillard | G06V 20/64 |
| 10,643,389 | B2* | 5/2020 | Lamb | G06F 3/013 |
| 10,675,542 | B2* | 6/2020 | Drouin | A63F 13/86 |
| 10,678,960 | B2* | 6/2020 | Jovanovic | G06T 15/10 |
| 10,795,434 | B2* | 10/2020 | Crispin | H04N 13/279 |
| 10,909,758 | B2* | 2/2021 | Bell | G06T 13/80 |
| 11,074,448 | B2* | 7/2021 | Chiche | G06T 3/40 |
| 11,317,080 | B2* | 4/2022 | Zhang | G06T 15/205 |
| 2015/0350626 | A1* | 12/2015 | Han | H04N 13/139 |
| | | | | 348/43 |
| 2019/0342632 | A1 | 11/2019 | Defaria et al. | |
| 2020/0175756 | A1* | 6/2020 | Crowe | G06T 17/20 |

FOREIGN PATENT DOCUMENTS

| | | |
|---|---|---|
| JP | 2018-181288 A | 11/2018 |
| KR | 10-2019-0080692 A | 7/2019 |
| WO | 2017/192467 A1 | 11/2017 |
| WO | WO-2017192467 A1 * 11/2017 | ............ G06T 15/20 |
| WO | WO-2018107997 A1 * 6/2018 | ........... H04N 13/139 |
| WO | WO-2021085130 A1 * 5/2021 | ............ G06F 3/013 |

\* cited by examiner

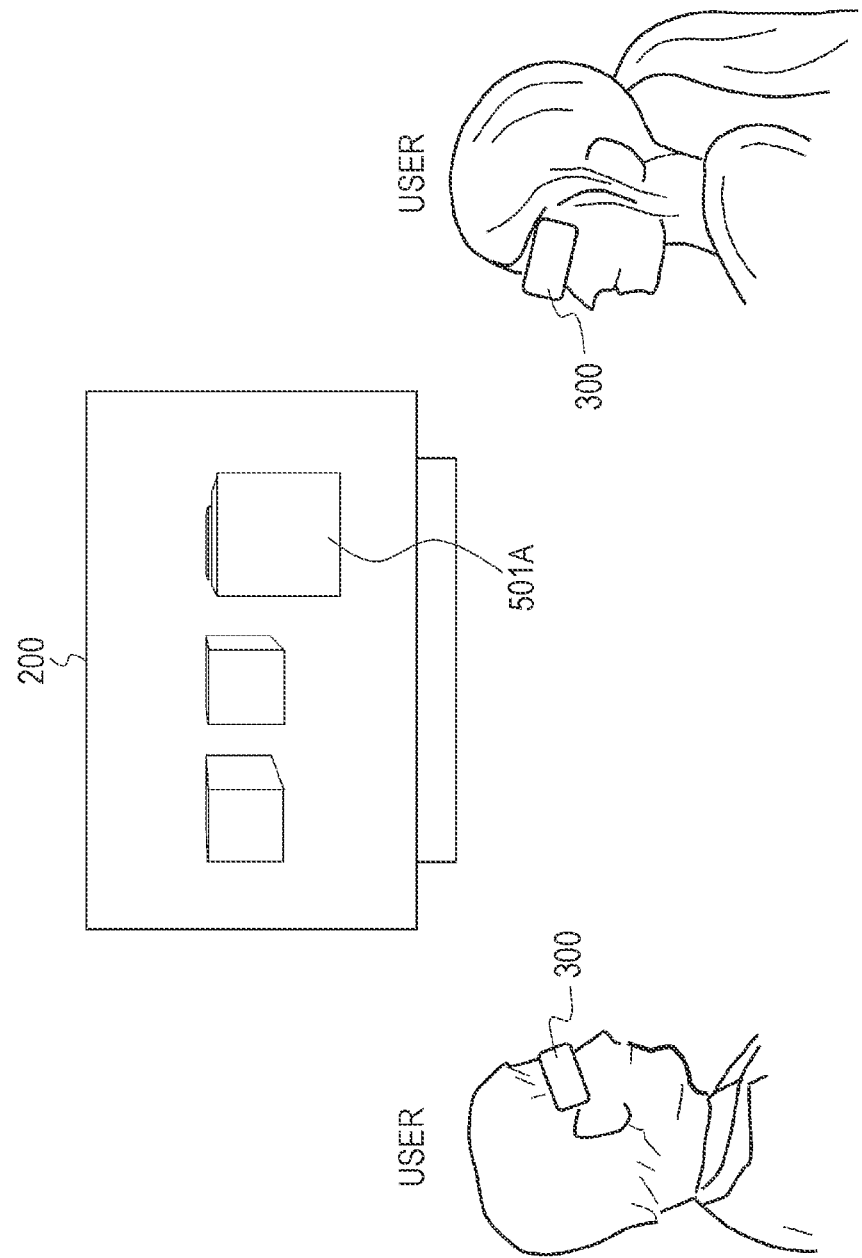

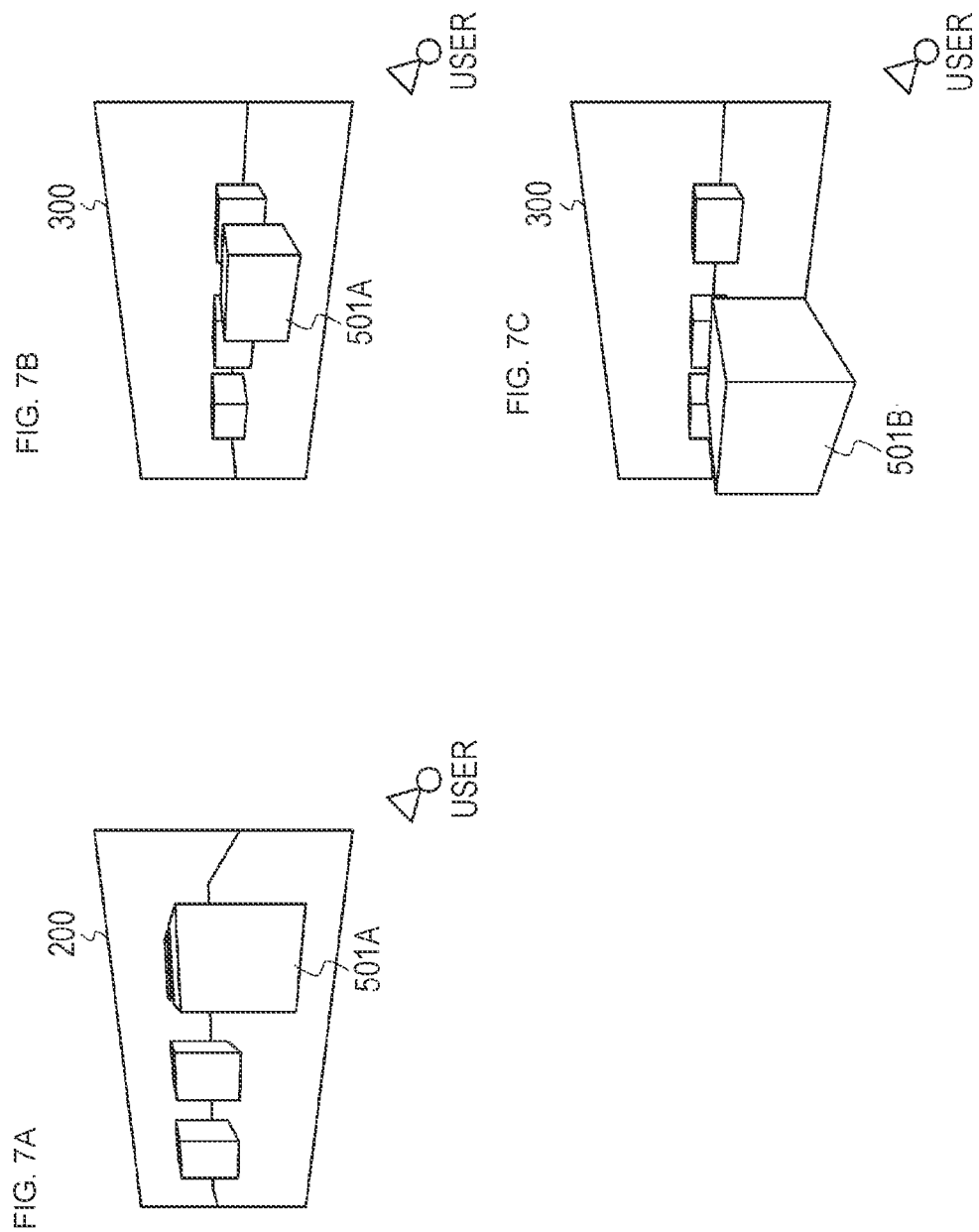

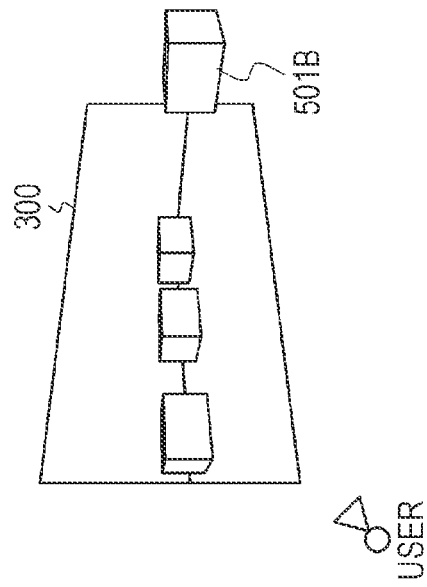
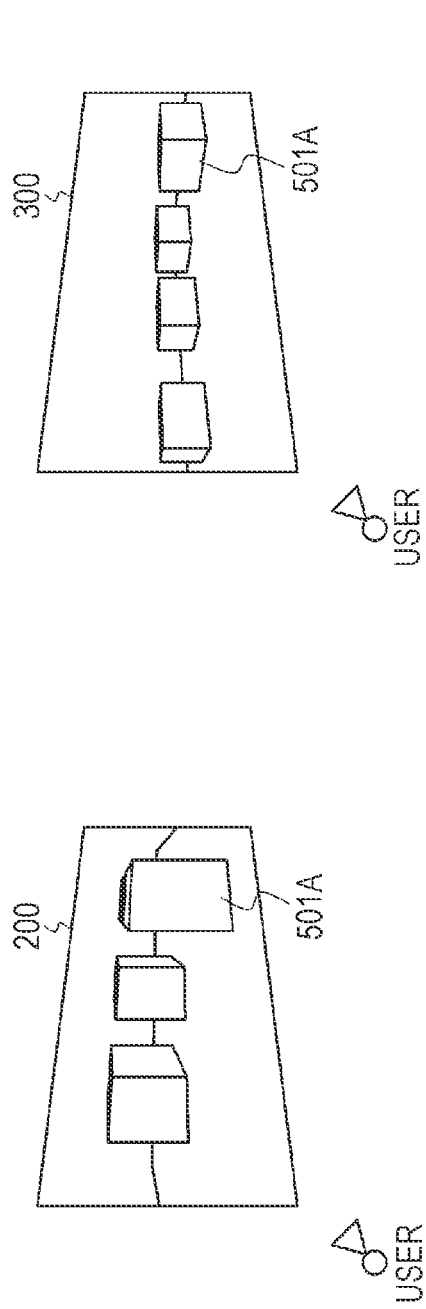
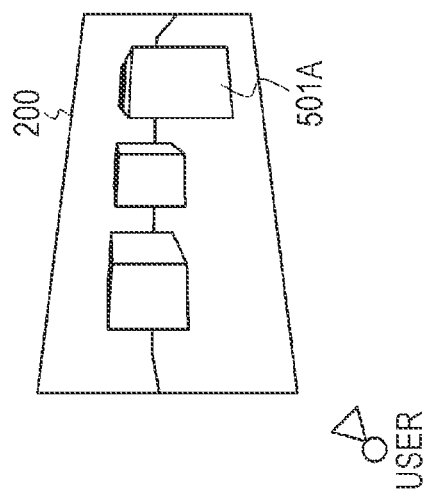

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/038735 filed on Oct. 14, 2020, which claims priority benefit of Japanese Patent Application No. JP 2019-194910 filed in the Japan Patent Office on Oct. 28, 2019. Each of the above-referenced applications is hereby incorporated herein by reference in its entirety.

TECHNICAL FIELD

The present technology relates to an information processing apparatus, an information processing method, and a program.

BACKGROUND ART

For example, Patent Document 1 discloses a conventional system in which a user can simultaneously observe two-dimensional content displayed on a two-dimensional display and a virtual object displayed on an augmented reality (AR) display device. Furthermore, for example, a conventional technology has been proposed in which a predetermined object of two-dimensional content such as a game or a movie displayed on a two-dimensional display is transitioned to pop out into a real space as a three-dimensional display model using a two-dimensional display such as a television receiver and an AR display device such as a smartphone.

CITATION LIST

Patent Document

Patent Document 1: Japanese Patent Application Laid-Open No. 2002-247602

SUMMARY OF THE INVENTION

Problems to be Solved by the Invention

In a case where a predetermined object of two-dimensional content displayed on a two-dimensional display is caused to transition to a three-dimensional display model of an AR display device, when the AR display device is obliquely positioned with respect to the two-dimensional display, there is a problem that an appearance angle of the three-dimensional display model does not coincide with a screen of the two-dimensional display, resulting in an unnatural appearance. In this case, it is not felt that the predetermined object of the two-dimensional content displayed on the two-dimensional display has transitioned to the three-dimensional display model.

An object of the present technology is to achieve natural appearance in a case where a predetermined object of two-dimensional content displayed on a two-dimensional display is caused to transition to a three-dimensional display model of an AR display device or vice versa.

Solutions to Problems

A concept of the present technology is
an information processing apparatus including
a control unit configured to perform control such that, in a case where a predetermined object of two-dimensional content displayed on a two-dimensional display is caused to transition as a three-dimensional display model of an augmented reality display device, or in a case where the three-dimensional display model of the augmented reality display device is caused to transition as the predetermined object of the two-dimensional content displayed on the two-dimensional display, the transition is performed after the two-dimensional content is switched from motion parallax non-application display to motion parallax application display.

The present technology is a technology for a case of transitioning a predetermined object of two-dimensional content displayed on a two-dimensional display as a three-dimensional display model of an augmented reality display device, or for a case of transitioning a three-dimensional display model of an augmented reality display device as a predetermined object of two-dimensional content displayed on a two-dimensional display.

The control unit performs control such that, the transition is performed after switching the two-dimensional content from the motion parallax non-application display to the motion parallax application display. For example, the control unit may perform control such that the motion parallax application display is displayed on the two-dimensional display in a case where there is one augmented reality display device, and the motion parallax application display is displayed on the augmented reality display device in a case where there is a plurality of augmented reality display devices.

In a case where there is one augmented reality display device, the motion parallax application display is displayed on the two-dimensional display, and it is possible to more naturally show that a predetermined object on the two-dimensional display pops out as a three-dimensional display model or that the three-dimensional display model returns as the predetermined object on the two-dimensional display. On the other hand, in a case where there is a plurality of augmented reality display devices, the motion parallax application display is displayed on the augmented reality display device, and the motion parallax application display matching the position of each augmented reality display device is performed. Therefore, it is possible to show the user natural transition in all the augmented reality display devices.

Furthermore, for example, the control unit may perform control such that the transition is performed on the basis of information on a position and orientation of the augmented reality display device with respect to the two-dimensional display. In this case, for example, a communication unit that communicates with the two-dimensional display and the augmented reality display device may be further provided, and the control unit may acquire user gaze information based on the information on the position and orientation from the augmented reality display device via the communication unit.

Furthermore, in this case, for example, the control unit may perform control such that the transition is performed when a distance between the two-dimensional display and the augmented reality display device is within a predetermined range. At this time, for example, the control unit may perform control such that the transition is performed when the orientation of the augmented reality display device is within a predetermined range with respect to the two-dimensional display. Then, at this time, for example, the control unit may perform control such that the transition is performed when a line-of-sight of a user wearing the augmented reality display device faces the two-dimensional display.

Furthermore, for example, the control unit may be included in a cloud server connected to the two-dimensional display and the augmented reality display device via a network. In this case, for example, the cloud server may be a game server. Furthermore, for example, in a case where the predetermined object of the two-dimensional content is caused to transition as the three-dimensional display model, the control unit may perform control such that the predetermined object is not displayed on the two-dimensional display after the transition and while the three-dimensional display model is displayed, or in a case where the three-dimensional display model is caused to transition as the predetermined object of the two-dimensional content, the control unit may perform control such that the three-dimensional display model is not displayed on the augmented reality display device after the transition and while the predetermined object of the two-dimensional content is displayed. In this case, for example, the predetermined object of the two-dimensional content and the three-dimensional display model may be content treated as the same object on an application executed by the control unit.

As described above, in the present technology, control is performed such that, in a case where a predetermined object of two-dimensional content displayed on a two-dimensional display is caused to transition as a three-dimensional display model of an augmented reality display device, or in a case where the three-dimensional display model of the augmented reality display device is caused to transition as the predetermined object of the two-dimensional content displayed on the two-dimensional display, the transition is performed after the two-dimensional content is switched from motion parallax non-application display to motion parallax application display. Therefore, it is possible to achieve natural appearance at the time of transition.

BRIEF DESCRIPTION OF DRAWINGS

FIG. 5 is a diagram illustrating a state where two-dimensional content is displayed on a 2D display and two users wearing AR display devices are gazing at the two-dimensional content.

FIGS. 7A, 7B, and 7C are diagrams for explaining a case where the motion parallax application display of the two-dimensional content is interposed in a case where transition from a predetermined object of the two-dimensional content to a three-dimensional display model is performed.

FIGS. 8A, 8B, and 8C are diagrams for explaining a case where the motion parallax application display of the two-dimensional content is interposed in a case where transition from a predetermined object of the two-dimensional content to a three-dimensional display model is performed.

MODE FOR CARRYING OUT THE INVENTION

Hereinafter, modes (hereinafter referred to as "embodiments") for carrying out the invention will be described. Note that the description will be given in the following order.

1. Embodiments
2. Modification

1. Embodiments

[Game System]

Figure 1:
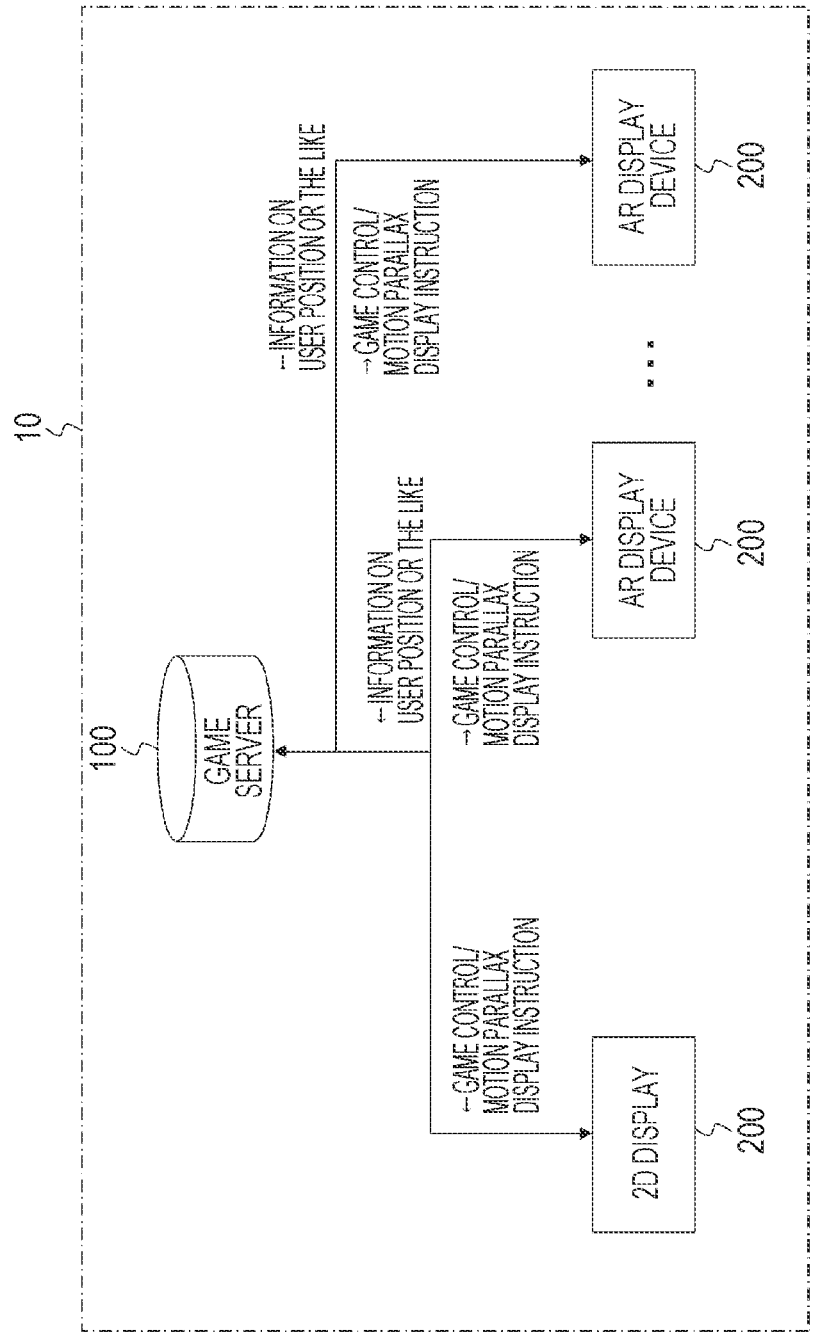
FIG. 1 is a block diagram illustrating a configuration example of a game system as an embodiment.

FIG. 1 illustrates a configuration example of a game system 10 as an embodiment. The game system 10 includes a game server 100, a two-dimensional (2D) display 200, and one or a plurality of augmented reality (AR) display devices 300.

The game server 100 is a device that manages progress of game content and constitutes a control unit. In this embodiment, the game server 100 is a cloud server accessed on a network such as the Internet. The 2D display 200 has a function equivalent to that of a personal computer (PC) or a game machine that executes a game. Specifically, the 2D display 200 is a television receiver, a projector, or the like. The AR display device 300 has a function of presenting a three-dimensional display model of augmented reality to the user. Specifically, the AR display device 300 is an AR glass, a head mounted display (HMD), or the like.

The 2D display 200 and the AR display device 300 are connected to the game server 100 via a network such as the Internet. A client application of a game application is installed in advance in the 2D display 200 and the AR display device 300, and the game progresses on the basis of game control by the game server 100.

In this case, information on the user position or the like is transmitted from the AR display device 300 to the game server 100. When it is determined that the user is gazing at the 2D display 200 through the display unit of the AR display device 300 and it is determined that it is a transition scene, the game server 100 causes the predetermined object of the two-dimensional content to transition to the three-dimensional display model or causes the three-dimensional display model to transition to the predetermined object of the two-dimensional content. Here, the predetermined object of the two-dimensional content and the three-dimensional display model are content treated as the same object on an application executed by the game server 100. Note that the predetermined object of the two-dimensional content and the three-dimensional display model are the same object, but there may be a change in the appearance of the object, for example, a change in the shape of the object before and after the transition.

Here, due to the transition from the predetermined object of the two-dimensional content to the three-dimensional display model, the predetermined object of the two-dimensional content displayed on the 2D display 200 comes out as an augmented reality three-dimensional display model. In a case where the predetermined object of the two-dimensional content is caused to transition as the three-dimensional display model as described above, the game server 100 performs control such that the predetermined object of the two-dimensional content is not displayed on the two-dimensional display 200 after the transition and while the three-dimensional display model is displayed. On the other hand, by the transition from the three-dimensional display model to the predetermined object of the two-dimensional content, the three-dimensional display model of the augmented reality enters as the predetermined object of the two-dimensional content displayed on the 2D display 200. In a case of transitioning the three-dimensional display model as the predetermined object of the two-dimensional content as described above, the game server 100 performs control such that the three-dimensional display model is not displayed on the AR display device 300 after the transition and while the predetermined object of the two-dimensional content is displayed.

In this embodiment, in a case of making such a transition, the game server 100 performs control such that the transition is performed after switching the two-dimensional content from the motion parallax non-application display (motion parallax absence display) to the motion parallax application display (motion parallax presence display). This allows the transition to occur in a natural appearance. Note that the motion parallax application display is a display method of displaying a predetermined object of the two-dimensional content on the display so as to be viewed as a solid according to the movement of the viewpoint position of the user, and the motion parallax non-application display is a display method of displaying a predetermined object of the two-dimensional content on the display without depending on the movement of the viewpoint position of the user.

Here, when there is one AR display device 300, that is, in the case of single-player play, the game server 100 performs control such that the motion parallax application display is displayed on the two-dimensional display 200. Therefore, it is possible to more naturally show that a predetermined object on the two-dimensional display pops out as a three-dimensional display model or that the three-dimensional display model returns as a predetermined object on the two-dimensional display.

In this case, the AR display device 300 determines whether the user is gazing at the 2D display 200 from sensor information of the mounted position and orientation, sensor information of the user's line-of-sight, and the like. For example, the AR display device 300 may determine that the user is gazing at the 2D display 200 when the distance between the AR display device 300 and the 2D display 200 is within a predetermined range.

Furthermore, for example, the AR display device 300 may determine that the user is gazing at the 2D display 200 when the distance between the AR display device 300 and the 2D display 200 is within a predetermined range and the orientation of the AR display device 300 is within a predetermined range with respect to the 2D display 200. In this case, a condition that the line-of-sight of the user is directed to the 2D display 200 may be further added.

When it is determined that the user is gazing at the 2D display 200, the AR display device 300 notifies the game server 100 of the user gaze. The game server 100 that has received the notification of the gaze determination notifies the 2D display 200 of the switching to the motion parallax application display. Upon receiving the notification, the 2D display 200 starts the motion parallax application display and notifies the game server 100 of the start of the motion parallax application display.

The game server 100 that has received the notification notifies the AR display device 300 of the transition start permission. The AR display device 300 that has received the notification starts the transition in which the three-dimensional display model exits from the 2D display 200. After notifying the game server 100 of the start of the motion parallax application display as described above, the 2D display 200 deletes the transition target object from the screen, and then returns to the normal display (motion parallax non-application display).

Figure 2:
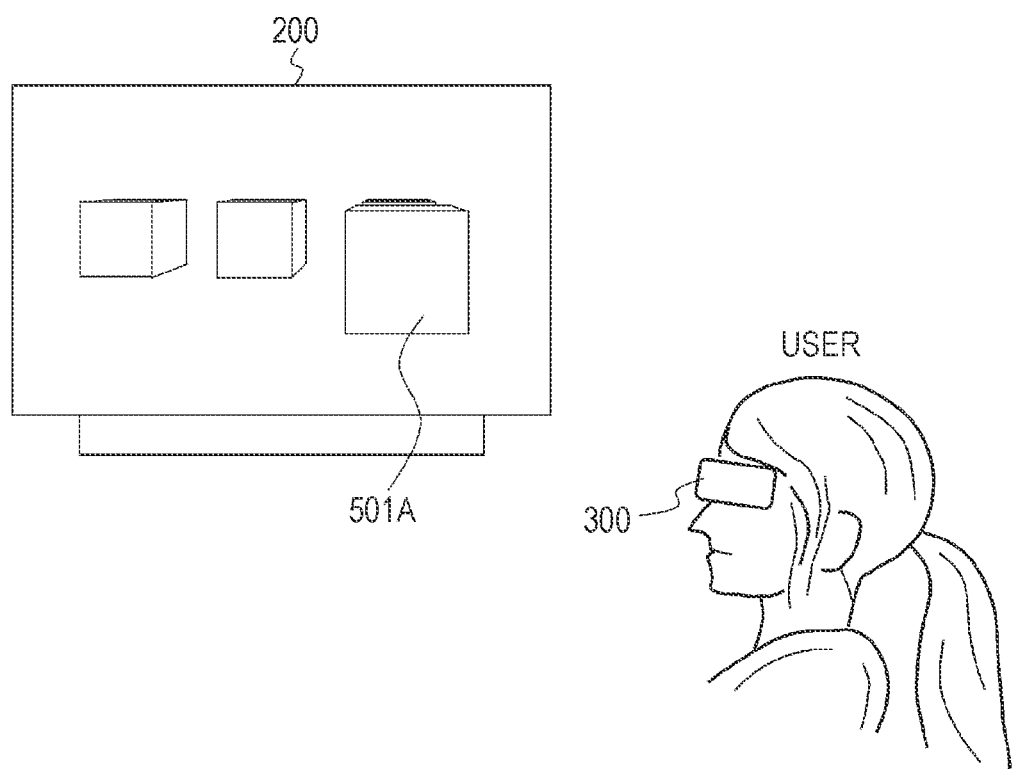
FIG. 2 is a diagram illustrating a state where two-dimensional content is displayed on a 2D display and one user wearing an AR display device is gazing at the two-dimensional content.

FIG. 2 illustrates a state where two-dimensional content is displayed on the 2D display 200 and one user wearing the AR display device 300 is gazing at the two-dimensional content. In such a state, when it is a scene (transition scene) for which display switching to the AR display device 300 is to be performed, transition from the predetermined object of the two-dimensional content to the three-dimensional display model is performed.

Figure 3C:
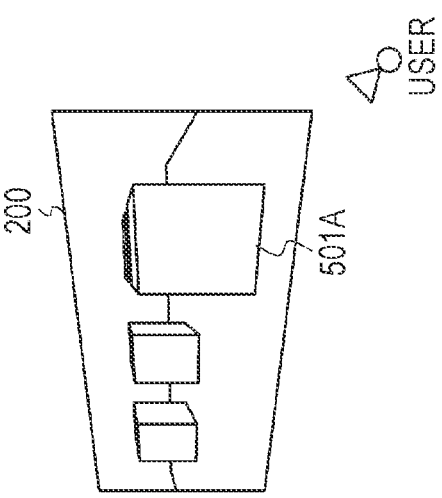
FIGS. 3A, 3B, 3C, and 3D are diagrams for explaining a case where the two-dimensional content is not switched to motion parallax application display in a case where transition from a predetermined object of the two-dimensional content to a three-dimensional display model is performed.
Figure 3D:
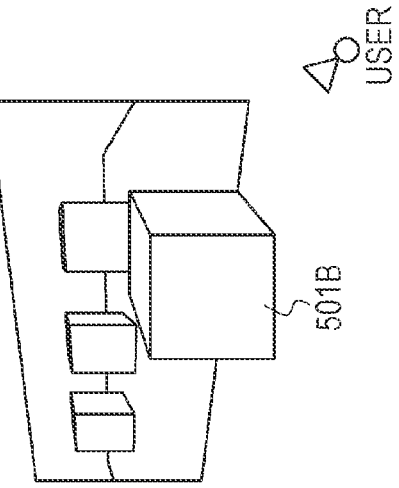
Figure 3A:
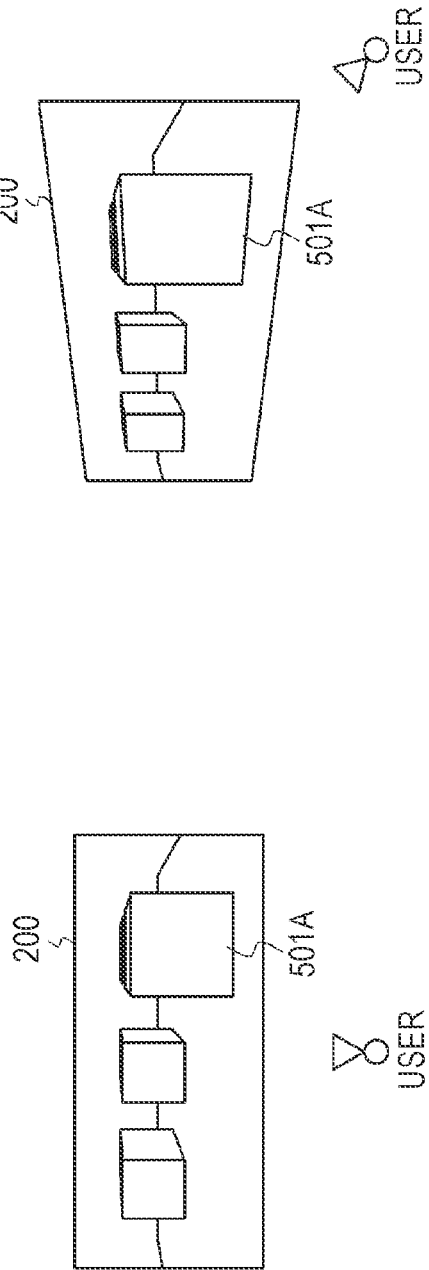
Figure 3B:
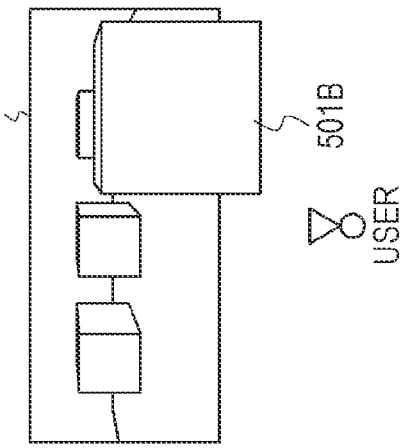

FIG. 3A illustrates a state where two-dimensional content is displayed on the 2D display 200 and the user is gazing at the two-dimensional content in front of the two-dimensional content. FIG. 3B illustrates a state where an object 501A of the two-dimensional content directly transitions to a three-dimensional display model 501B corresponding to the front position. In this case, the appearance is not so unnatural.

FIG. 3C illustrates a state where two-dimensional content is displayed on the 2D display 200 and the user is gazing at the two-dimensional content from the right of the two-dimensional content. FIG. 3D illustrates a state where the object 501A of the two-dimensional content directly transitions to the three-dimensional display model 501B corresponding to the right position. In this case, the angle at which the three-dimensional display model 501B appears does not match the screen of the 2D display 200, resulting in an unnatural appearance.

Figure 4A:
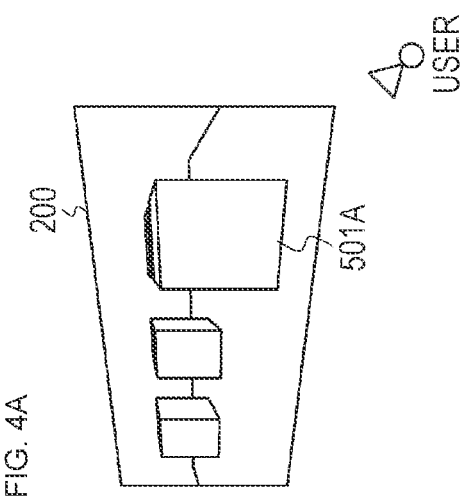
FIGS. 4A, 4B, and 4C are diagrams for explaining a case where the motion parallax application display of the two-dimensional content is interposed in a case where transition from a predetermined object of the two-dimensional content to a three-dimensional display model is performed.
Figure 4B:
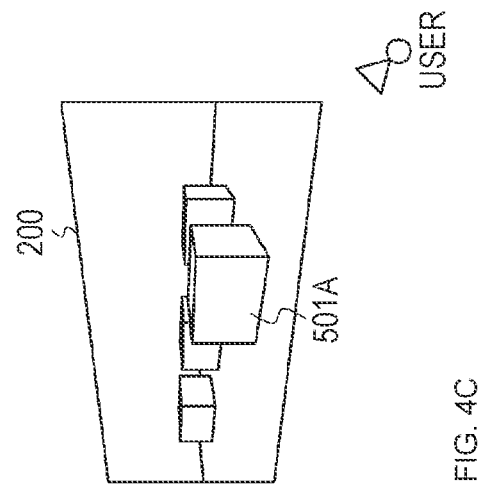
Figure 4C:
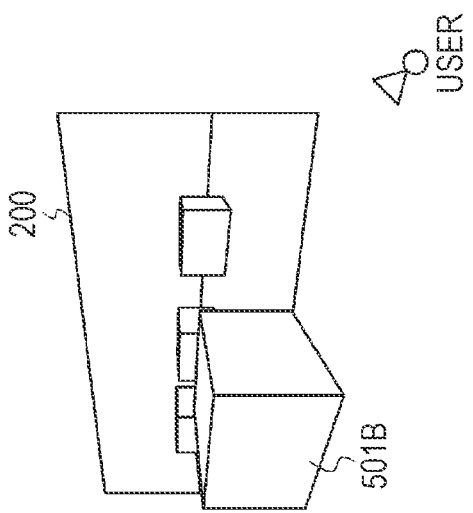

FIG. 4A illustrates a state where two-dimensional content is displayed on the 2D display 200 and the user is gazing at the two-dimensional content from the right of the two-dimensional content. FIG. 4B illustrates a state where the display of the two-dimensional content on the 2D display 200 is switched to the motion parallax application display corresponding to the right user position. FIG. 4C illustrates a state where the object 501A of the two-dimensional content in the state of the motion parallax application display transitions to the three-dimensional display model 501B corresponding to the right position. In this case, unlike the case of FIG. 3D, the appearance is natural.

The above description is for the case of the transition from the predetermined object of the two-dimensional content to the three-dimensional display model. Although the detailed description is omitted here, the substantially similar operation is performed in the case of the transition from the three-dimensional display model to the predetermined object of the two-dimensional content.

Furthermore, here, when there is a plurality of AR display devices 300, that is, in the case of multi-player play, the game server 100 performs control such that the motion parallax application display is displayed on the AR display device 300. As a result, since the motion parallax application display matching the position of each AR display device 300, that is, the user position is performed, it is possible to show natural transitions in all the AR display devices 300.

In this case, the AR display device 300 determines whether the user is gazing at the 2D display 200 from sensor information of the mounted position and orientation, sensor information of the user's line-of-sight, and the like. Although detailed description is omitted, the manner of this determination is similar to the case of the single-player play described above. When it is determined that the user is gazing at the 2D display 200, the AR display device 300 notifies the game server 100 of the user gaze.

When the two-dimensional content of the 2D display 200 is switched to the motion parallax application display in accordance with the position of a specific user in the multi-player play, the appearance of the two-dimensional content on the 2D display 200 of another user becomes unnatural. Therefore, in the case of the multi-player play, the game server 100 that has received the notification of the gaze determination notifies the AR display device 300 of the switching to the motion parallax application display. Upon receiving the notification, the AR display device 300 starts the motion parallax application display of the two-dimensional content and notifies the game server 100 of the start of the motion parallax application display.

The game server 100 that has received the start notification of the motion parallax application display from all the AR display devices 300 notifies the 2D display 200 of the deletion of the transition target object. Upon receiving the notification, the 2D display 100 deletes the transition target object from the screen. After notifying the game server 100 of the start of the motion parallax application display as described above, the AR display device 300 starts the transition in which the three-dimensional display model exits from the two-dimensional content of the motion parallax application display, and then ends the display of the two-dimensional content.

FIG. 5 illustrates a state where two-dimensional content is displayed on the 2D display 200 and a plurality of, here, two users wearing the AR display device 300 is gazing at the two-dimensional content. In such a state, when it is a scene (transition scene) for which display switching to the AR display device 300 is to be performed, transition from the predetermined object of the two-dimensional content to the three-dimensional display model is performed.

Figure 6A:
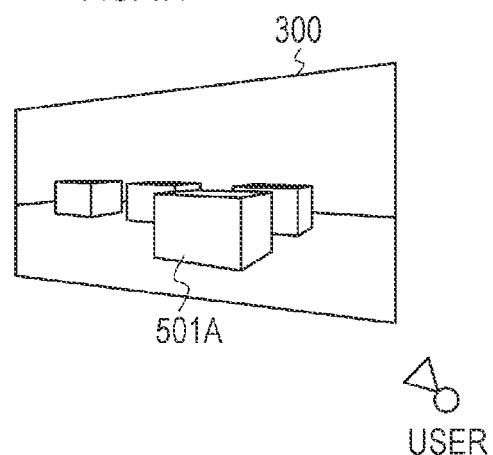
FIGS. 6A and 6B are diagrams for explaining the motion parallax application display of the two-dimensional content displayed on the AR display device.
Figure 6B:
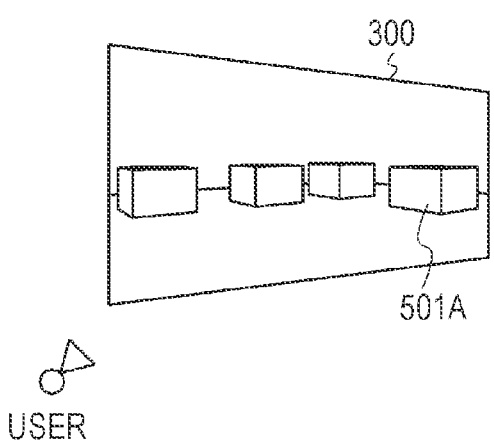

FIG. 6A illustrates the motion parallax application display corresponding to the right user position of the two-dimensional content displayed on the AR display device 300. Furthermore, FIG. 6B illustrates the motion parallax application display corresponding to the left user position of the two-dimensional content displayed on the AR display device 300.

FIG. 7A illustrates a state where two-dimensional content is displayed on the 2D display 200 and the user is gazing at the two-dimensional content from the right of the two-dimensional content. FIG. 7B illustrates a state where the display of the two-dimensional content on the 2D display 200 is switched to the motion parallax application display corresponding to the right user position. This motion parallax application display is displayed not on the 2D display 200 but on the AR display device 300 of the right user. FIG. 7C illustrates a state where the object 501A of the two-dimensional content in the state of the motion parallax application display transitions to the three-dimensional display model 501B corresponding to the right position. In this case, the appearance is natural.

FIG. 8A illustrates a state where two-dimensional content is displayed on the 2D display 200 and the user is gazing at the two-dimensional content from the left of the two-dimensional content. FIG. 8B illustrates a state where the display of the two-dimensional content on the 2D display 200 is switched to the motion parallax application display corresponding to the left user position. This motion parallax application display is displayed not on the 2D display 200 but on the AR display device 300 of the left user. FIG. 8C illustrates a state where the object 501A of the two-dimensional content in the state of the motion parallax application display transitions to the three-dimensional display model 501B corresponding to the left position. In this case, the appearance is natural.

The above description is for the case of the transition from the predetermined object of the two-dimensional content to the three-dimensional display model. Although the detailed description is omitted here, the substantially similar operation is performed in the case of the transition from the three-dimensional display model to the predetermined object of the two-dimensional content.

Figure 9:
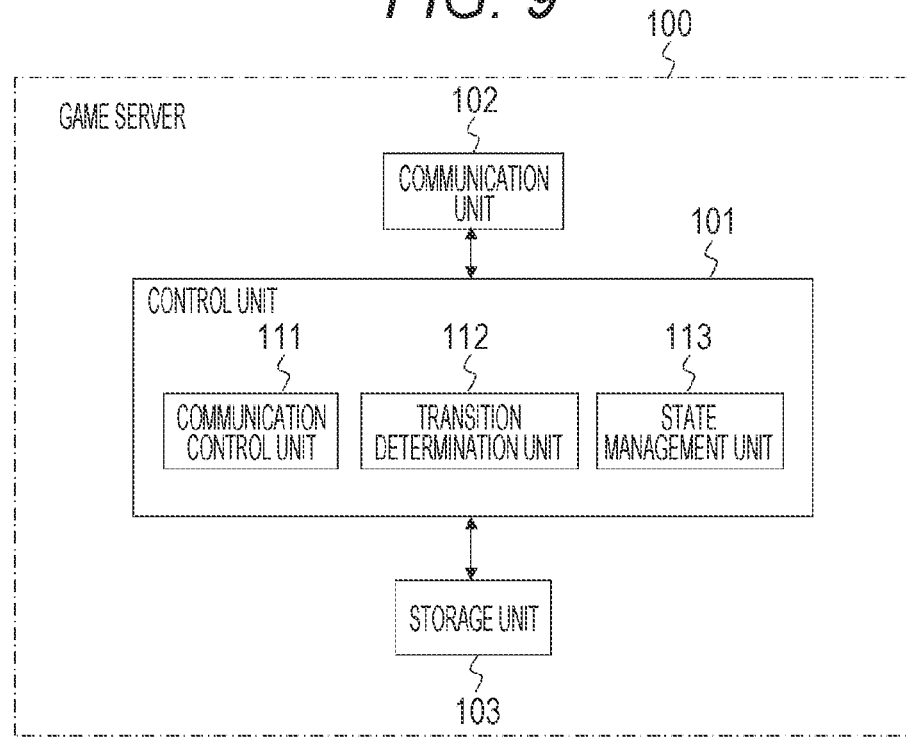
FIG. 9 is a block diagram illustrating a configuration example of a game server.

FIG. 9 illustrates a configuration example of the game server 100. The game server 100 is a device that manages progress of game content or video content. The game server 100 includes a control unit 101, a communication unit 102, and a storage unit 103. The control unit 101 controls the operation of each unit of the game server 100 by using hardware such as a CPU and a RAM in the game server 100.

The control unit 101 includes a communication control unit 111, a transition determination unit 112, and a state management unit 113. Here, the configuration is similar to that of a general game server except for the transition determination unit 112.

The communication control unit 111 has a function for communicating with a device (2D display 200, AR display device 300, or the like) that executes a game. The transition determination unit 112 has a function of determining whether or not to switch the display from the 2D display 200 to the AR display device or vice versa, and determining which device performs the motion parallax representation.

Specifically, the determination is made on the basis of the user gaze information of the 2D display 200 transmitted from the AR display device 300 and the progress status of the game content or the video content. The state management unit 113 has a function of managing the progress of the game content or the video content according to the state of the user. This is a standard function in general online games.

Figure 10:
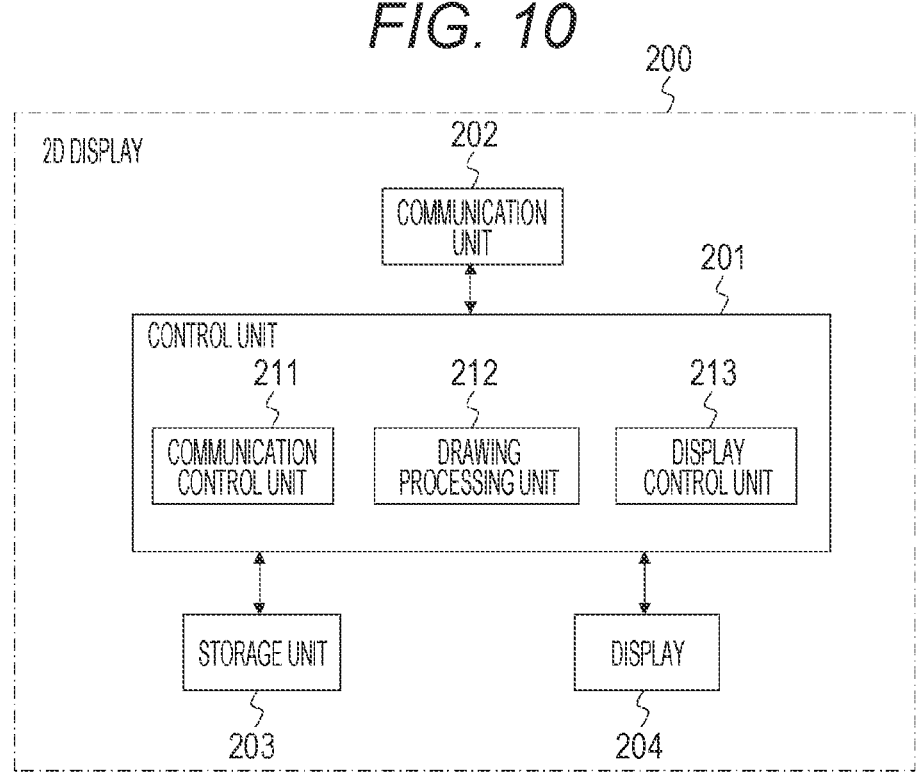
FIG. 10 is a block diagram illustrating a configuration example of a 2D display.

FIG. 10 illustrates a configuration example of the 2D display 200. The 2D display 200 includes a control unit 201, a communication unit 202, a storage unit 203, and a display 204. The control unit 201 controls the operation of each unit of the 2D display 200 by using hardware such as a CPU and a RAM in the 2D display 200.

The control unit 201 includes a communication control unit 211, a drawing processing unit 212, and a display control unit 213. Here, the configuration other than the drawing processing unit 212 is equivalent to the configuration of a general PC or game machine that executes a game.

The communication control unit 211 has a function for communicating with the game server 100. The drawing control unit 212 has a function of rendering (drawing) content to be displayed on the 2D display 200. The drawing processing unit 212 also performs processing of generating an image in which motion parallax is enabled. The display control unit 213 has a function of displaying a rendering result by the drawing processing unit 212 on the display 204.

Figure 11:
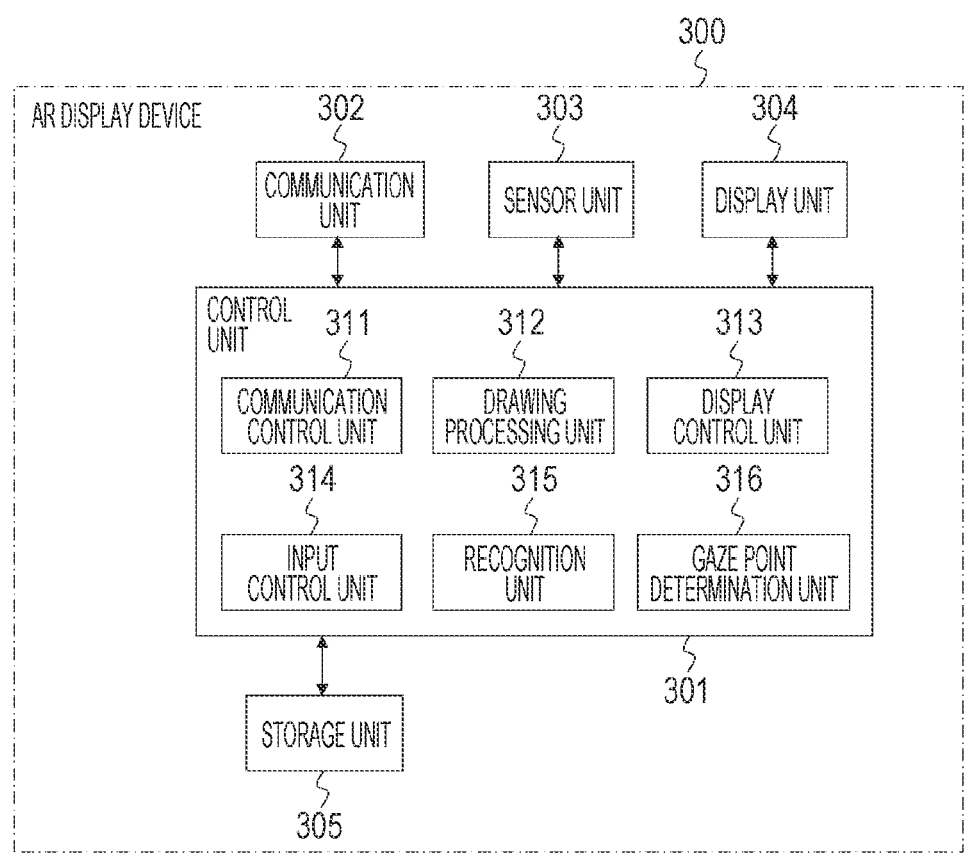
FIG. 11 is a block diagram illustrating a configuration example of the AR display device.

FIG. 11 illustrates a configuration example of the AR display device 300. The AR display device 300 includes a control unit 301, a communication unit 302, a sensor unit 303, a display unit 304, and a storage unit 305.

The sensor unit 303 is a sensor for obtaining user information and external environment information. The sensor unit 303 includes various sensors such as a stereo camera and a gyro sensor. The display unit 304 includes a left-eye display and a right-eye display.

The control unit 301 controls the operation of each unit of the AR display device 300 by using hardware such as a CPU and a RAM in the AR display device 300. The control unit 301 includes a communication control unit 311, a drawing processing unit 312, a display control unit 313, an input control unit 314, a recognition unit 315, and a gaze point determination unit 316.

The input control unit 314 has a function of managing input information from a camera and other sensors included in the sensor unit 303. The communication control unit 311 has a function for communicating with the game server 100. The recognition unit 315 recognizes the position and posture of the AR display device 300 with respect to the 2D display 200 and further recognizes the line-of-sight of the user by image recognition or the like with respect to the camera image.

The gaze point determination unit 316 determines whether or not the user is gazing at the 2D display 200 from the information obtained from the recognition unit 315 and a previous space map. The drawing processing unit 312 has a function of rendering (drawing) content (three-dimensional display model) to be displayed on the AR display device 300. The drawing processing unit 312 also performs control to display the two-dimensional content in which the motion parallax is enabled at the position of the 2D display 200 at the time of the display transition in the plurality of players. The display control unit 313 has a function of displaying a rendering result by the drawing processing unit 312 on the display unit 304.

Figure 12:
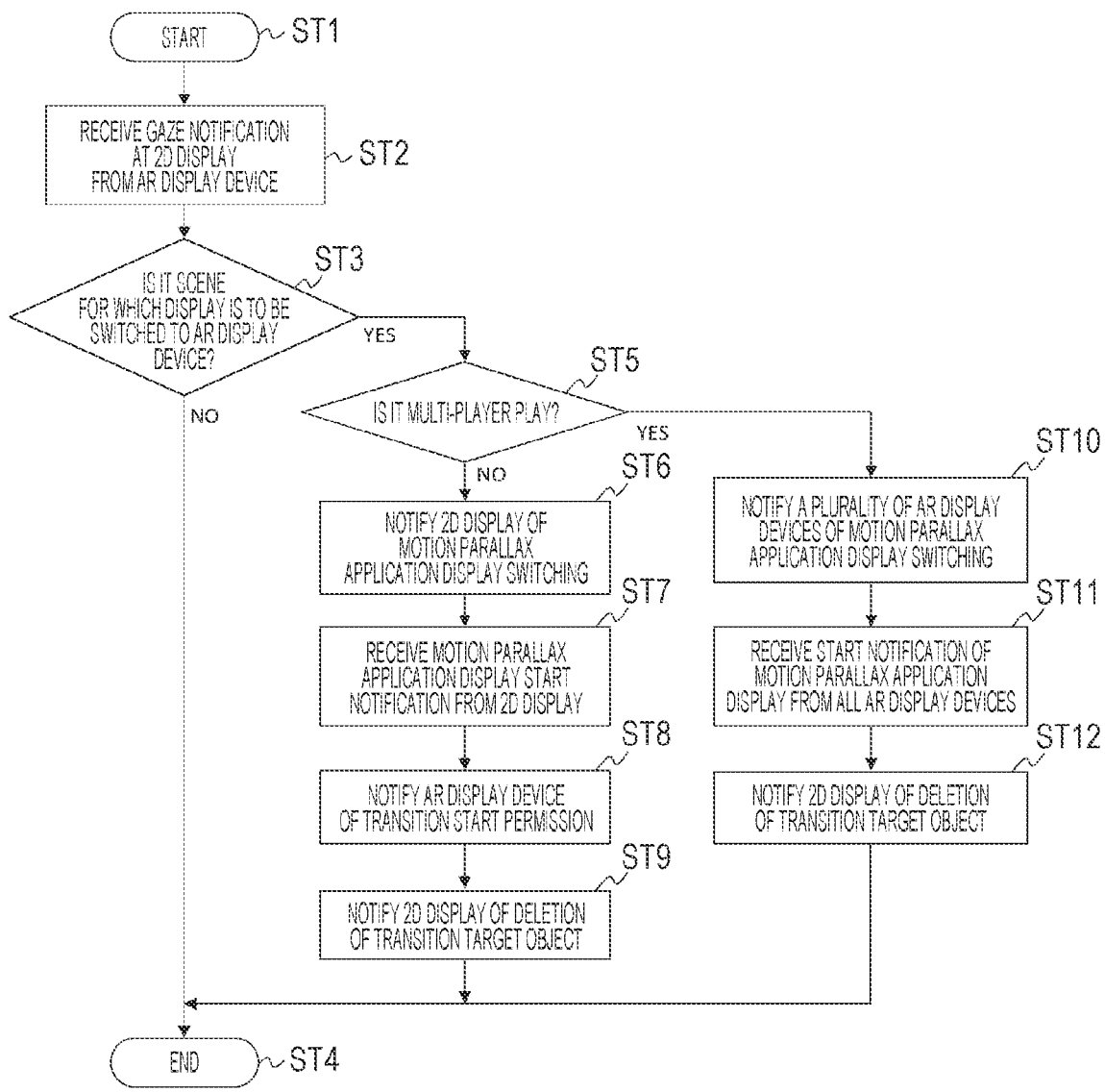
FIG. 12 is a flowchart illustrating an example of a processing procedure of a game server in a case where transition from the predetermined object of the two-dimensional content to the three-dimensional display model is performed.

The flowchart of FIG. 12 illustrates an example of a processing procedure of the game server 100 in a case where transition from the predetermined object of the two-dimensional content to the three-dimensional display model is performed. The game server 100 repeatedly performs the processing of the flowchart of FIG. 12.

In step ST1, the game server 100 starts the processing, for example, at the timing of the start of the game. Next, in step ST2, the game server 100 receives a gaze notification of the 2D display 200 from one or a plurality of AR display devices 300, and thereafter, in step ST3, determines whether or not the scene is a scene (transition scene) for which display switching to the AR display device 300 is to be performed. When determining that the scene is not the scene, the game server 100 ends the processing in step ST4.

Furthermore, when determining in step ST3 that it is a scene for which display switching to the AR display device 300 is to be performed, the game server 100 determines in step ST5 whether or not it is multi-player play. Here, when there is one AR display device 300 that has received the gaze notification in step ST2, the game server 100 determines that it is single-player play, and when there is a plurality of AR display devices, it is determined that it is multi-player play.

When determining that it is not the multi-player play, that is, it is the single-player play, in step ST6, the game server 100 notifies the 2D display 200 of the switching to the motion parallax application display (the motion parallax presence display). Next, in step ST7, the game server 100 receives a motion parallax application display start notification from the 2D display 200.

Next, in step ST8, the game server 100 notifies the AR display device 300 of the transition start permission. Next, in step ST9, the game server 100 notifies the 2D display 200 of deletion of the transition target object. After the processing of step ST9, the game server 100 proceeds to step ST4 and ends the processing.

Furthermore, when determining in step ST5 that it is the multi-player play, in step ST10, the game server 100 notifies the plurality of AR display devices 300 of the switching to the motion parallax application display (motion parallax presence display). Next, in step ST11, the game server 100 receives the start notification of the motion parallax application display from all the AR display devices 300, and thereafter, in step ST12, notifies the 2D display 200 of deletion of the transition target object. After the processing of step ST12, the game server 100 proceeds to step ST4 and ends the processing.

Figure 13:
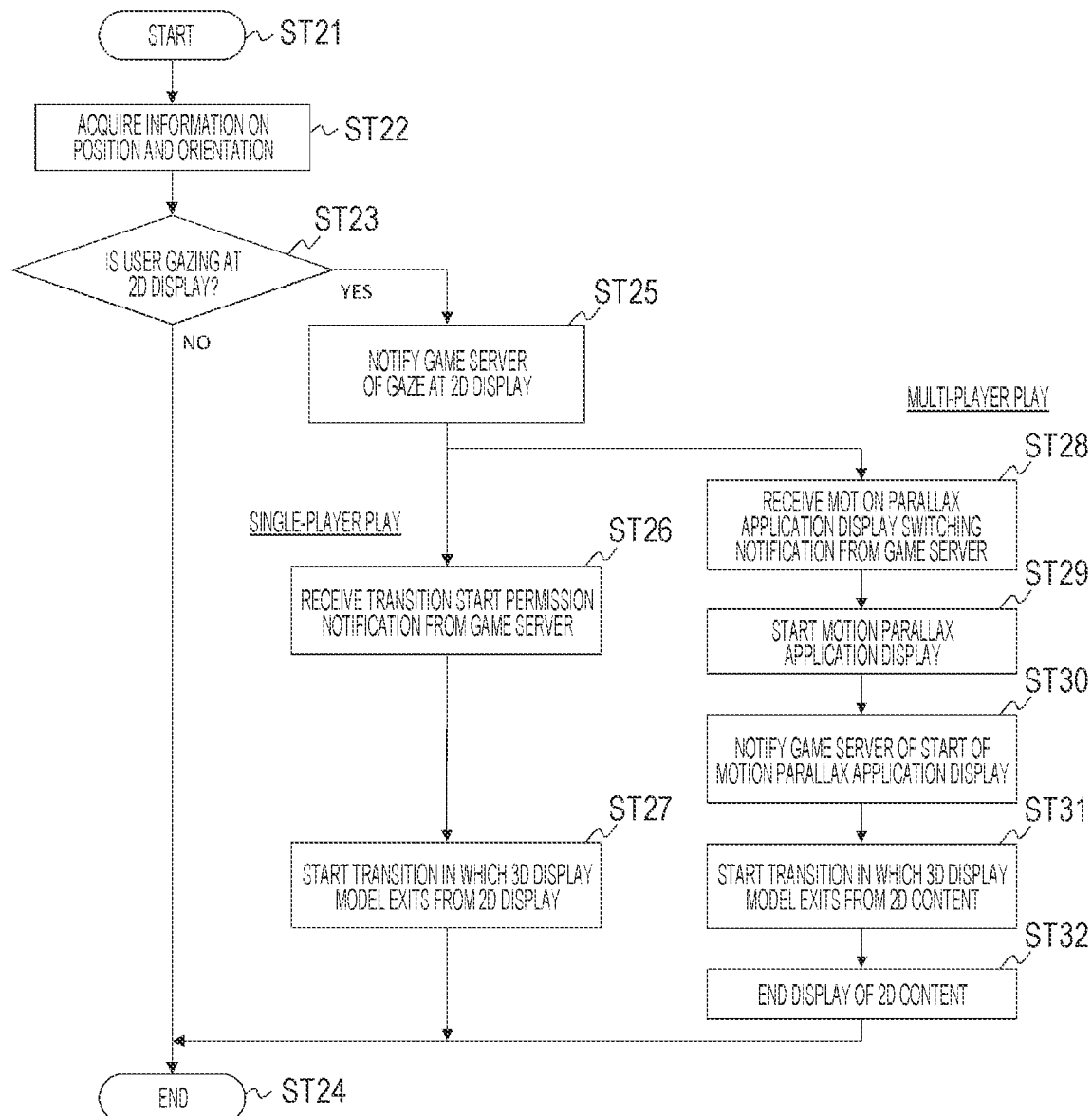
FIG. 13 is a flowchart illustrating an example of a processing procedure of the AR display device in a case where transition from the predetermined object of the two-dimensional content to the three-dimensional display model is performed.

The flowchart of FIG. 13 illustrates an example of a processing procedure of the AR display device 300 in a case where transition from the predetermined object of the two-dimensional content to the three-dimensional display model is performed. The AR display device 300 repeatedly performs the processing of the flowchart of FIG. 13.

In step ST21, the AR display device 300 starts the processing, for example, at the timing of the start of the game. Next, in step ST22, the AR display device 300 acquires position and orientation information. In this case, information on the line-of-sight of the user may be further acquired. Next, in step ST23, the AR display device 300 determines whether or not the user is gazing at the 2D display 200 on the basis of the information acquired in step ST22. When determining that the user is not gazing at the 2D display 200, in step ST24, the AR display device 300 ends the processing.

Furthermore, when it is determined in step ST23 that the user is gazing at the 2D display 200, the AR display device 300 notifies the game server 100 of the gaze at the 2D display 200 in step ST25.

Next, in the case of the single-player play, in step ST26, the AR display device 300 receives a transition start permission notification from the game server 100. Next, in step ST27, the AR display device 300 starts the transition in which the three-dimensional display model comes out of the 2D display 200. After the processing of step ST27, the AR display device 300 proceeds to step ST24 and ends the processing.

Furthermore, in the case of the multi-player play, in step ST28, the AR display device 300 receives a notification of the motion parallax application display switching from the game server 100. Next, in step ST29, the AR display device 300 starts the motion parallax application display. That is, the AR display device 300 starts displaying the two-dimensional content in which the motion parallax is enabled at the position of the 2D display 200.

Next, in step ST30, the AR display device 300 notifies the game server 100 of the start of the motion parallax application display. Next, in step ST31, the AR display device 300 starts the transition in which the three-dimensional display model exits from the 2D content in which the motion parallax is enabled. Next, in step ST32, the AR display device 300 ends the display of the two-dimensional content in which the motion parallax is enabled. After the processing of step ST32, the AR display device 300 proceeds to step ST24 and ends the processing.

Figure 14:
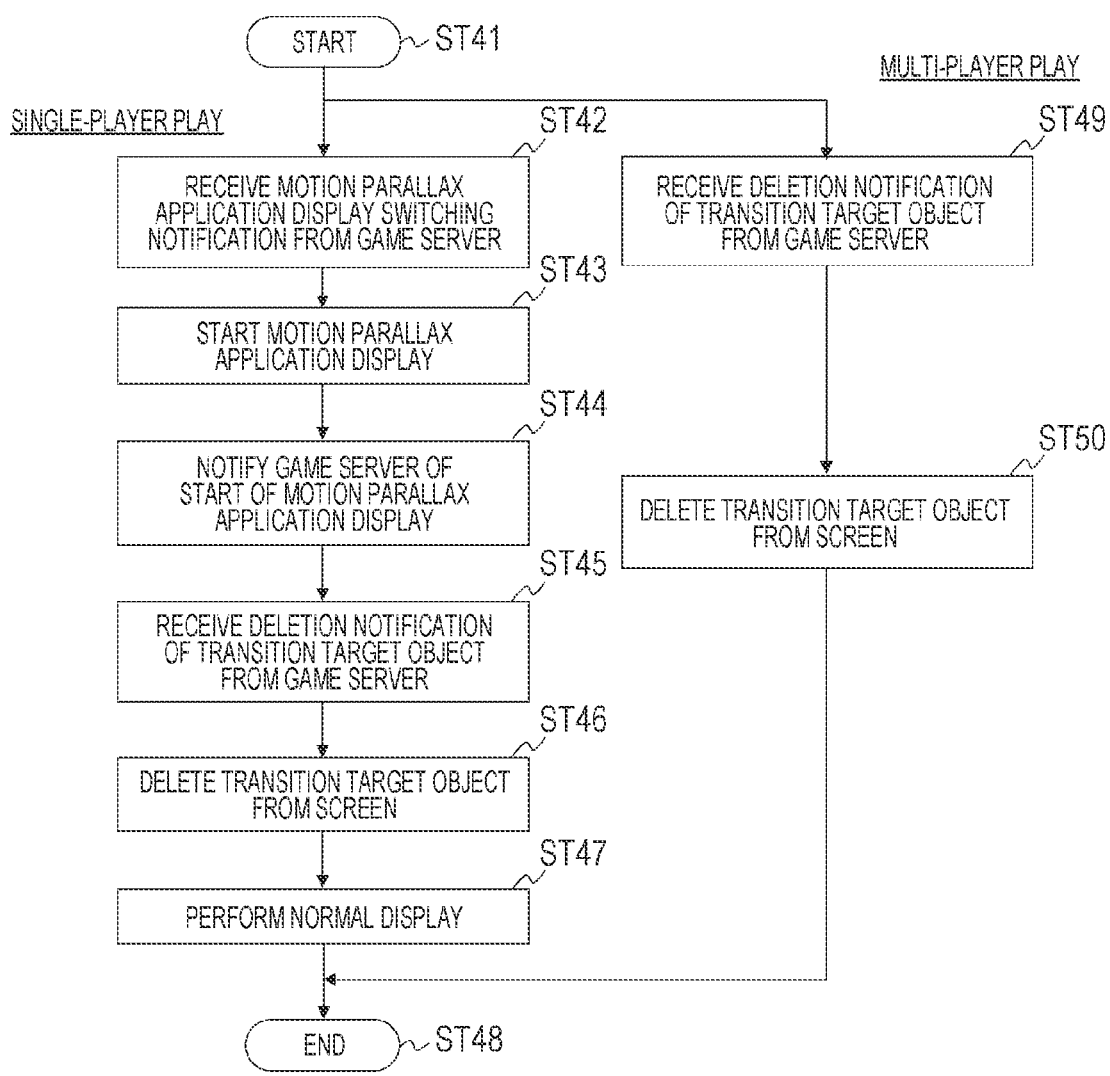
FIG. 14 is a flowchart illustrating an example of a processing procedure of a 2D display in a case where transition from the predetermined object of the two-dimensional content to the three-dimensional display model is performed.

The flowchart of FIG. 14 illustrates an example of a processing procedure of the 2D display 200 in a case where transition from the predetermined object of the two-dimensional content to the three-dimensional display model is performed. The 2D display 200 repeatedly performs the processing of the flowchart of FIG. 14.

In step ST41, the 2D display 200 starts the processing, for example, at the game start timing.

Next, in the case of the single-player play, in step ST42, the 2D display 200 receives a notification of switching of the motion parallax application display from the game server 100. Next, in step ST43, the 2D display 200 starts the motion parallax application display. Next, in step ST44, the 2D display 200 notifies the game server 100 of the start of the motion parallax application display.

Next, in step ST45, the 2D display 200 receives a deletion notification of the transition target object from the game server 100. Next, in step ST46, the 2D display 200 deletes the transition target object from the screen (the display screen of the two-dimensional content). Next, the 2D display 200 performs normal display, that is, motion parallax non-application display (motion parallax absence display). After the processing of step ST47, the 2D display 200 proceeds to step ST48 and ends the processing.

Furthermore, in a case where it is the multi-player play, in step ST49, the 2D display 200 receives a deletion notification of the transition target object from the game server 100. Next, in step ST50, the 2D display 200 deletes the transition target object from the screen (the display screen of the two-dimensional content). After the processing of step ST50, the 2D display 200 proceeds to step ST48 and ends the processing.

Figure 15:
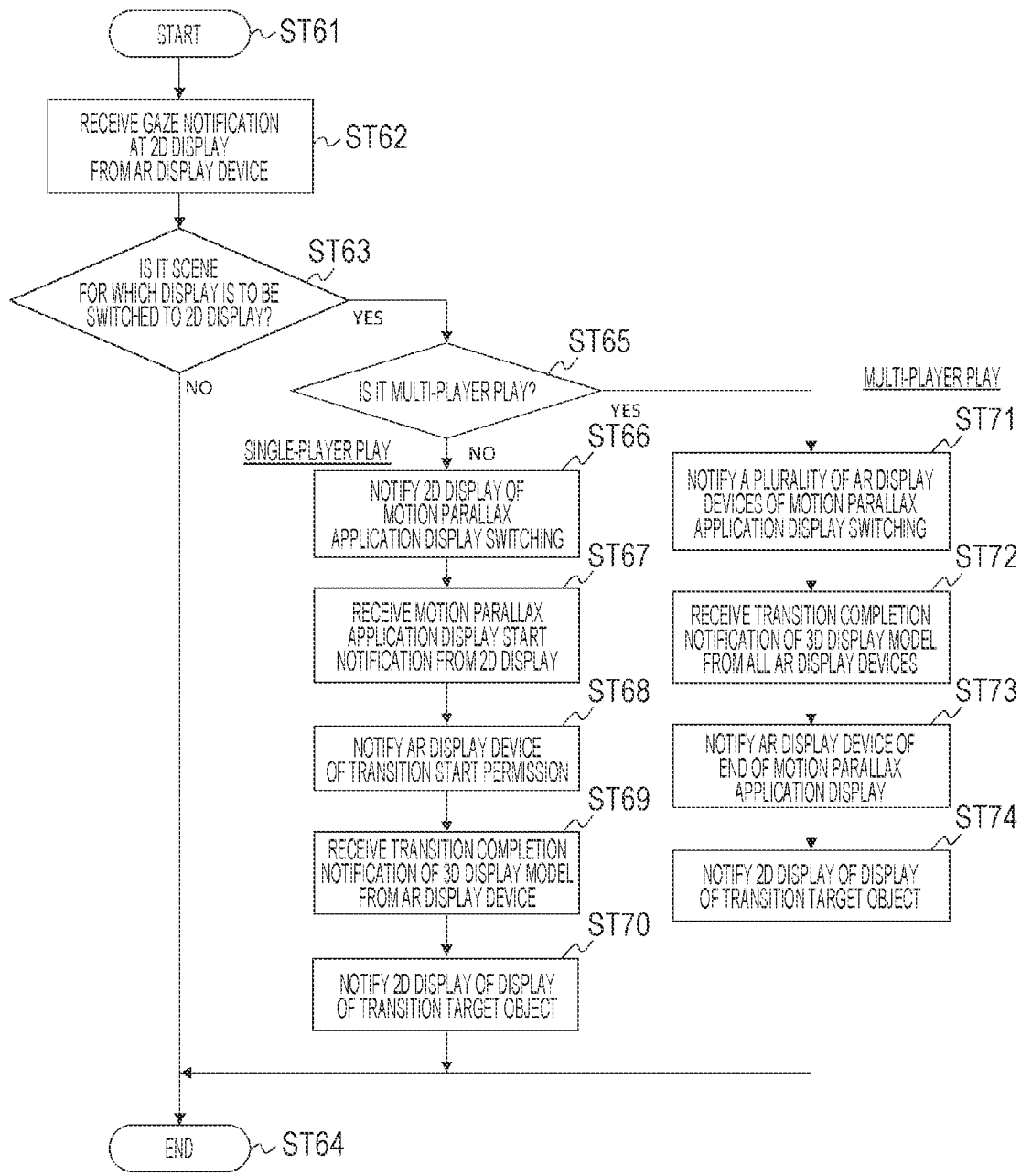
FIG. 15 is a flowchart illustrating an example of a processing procedure of a game server in a case where transition from the three-dimensional display model to the predetermined object of the two-dimensional content is performed.

The flowchart of FIG. 15 illustrates an example of a processing procedure of the game server 100 in a case where transition from the three-dimensional display model to the predetermined object of the two-dimensional content is performed. The game server 100 repeatedly performs the processing of the flowchart of FIG. 15.

In step ST61, the game server 100 starts the processing, for example, at the timing of the start of the game. Next, in step ST62, the game server 100 receives a gaze notification of the 2D display 200 from one or a plurality of AR display devices 300, and thereafter, in step ST63, determines whether or not the scene is a scene (transition scene) for which display switching to the 2D display 200 is to be performed. When determining that the scene is not the scene, the game server 100 ends the processing in step ST64.

Furthermore, when determining in step ST63 that it is a scene for which display switching to the 2D display is to be performed, the game server 100 determines in step ST65 whether or not it is multi-player play. Here, when there is one AR display device 300 that has received the gaze notification in step ST62, the game server 100 determines that it is single-player play, and when there is a plurality of AR display devices, it is determined that it is multi-player play.

When determining that it is not the multi-player play, that is, it is the single-player play, in step ST66, the game server 100 notifies the 2D display 200 of the switching to the motion parallax application display (the motion parallax presence display). Next, in step ST67, the game server 100 receives a motion parallax application display start notification from the 2D display 200.

Next, in step ST68, the game server 100 notifies the AR display device 300 of the transition start permission. Next, in step ST69, the game server 100 receives a transition completion notification of the three-dimensional display model from the AR display device 300. Next, in step ST70, the game server 100 notifies the 2D display 200 of display of the transition target object. After the processing of step ST70, the game server 100 proceeds to step ST64 and ends the processing.

Furthermore, when determining in step ST65 that it is the multi-player play, in step ST71, the game server 100 notifies the plurality of AR display devices 300 of the switching to the motion parallax application display (motion parallax presence display). Next, in step ST72, the game server 100 receives a transition completion notification of the three-dimensional display model from all the AR display devices 300.

Next, in step ST73, the game server 100 notifies the AR display device 300 of the end of the motion parallax application display. Next, in step ST74, the game server 100 notifies the 2D display 200 of display of the transition target object. After the processing of step ST74, the game server 100 proceeds to step ST64 and ends the processing.

Figure 16:
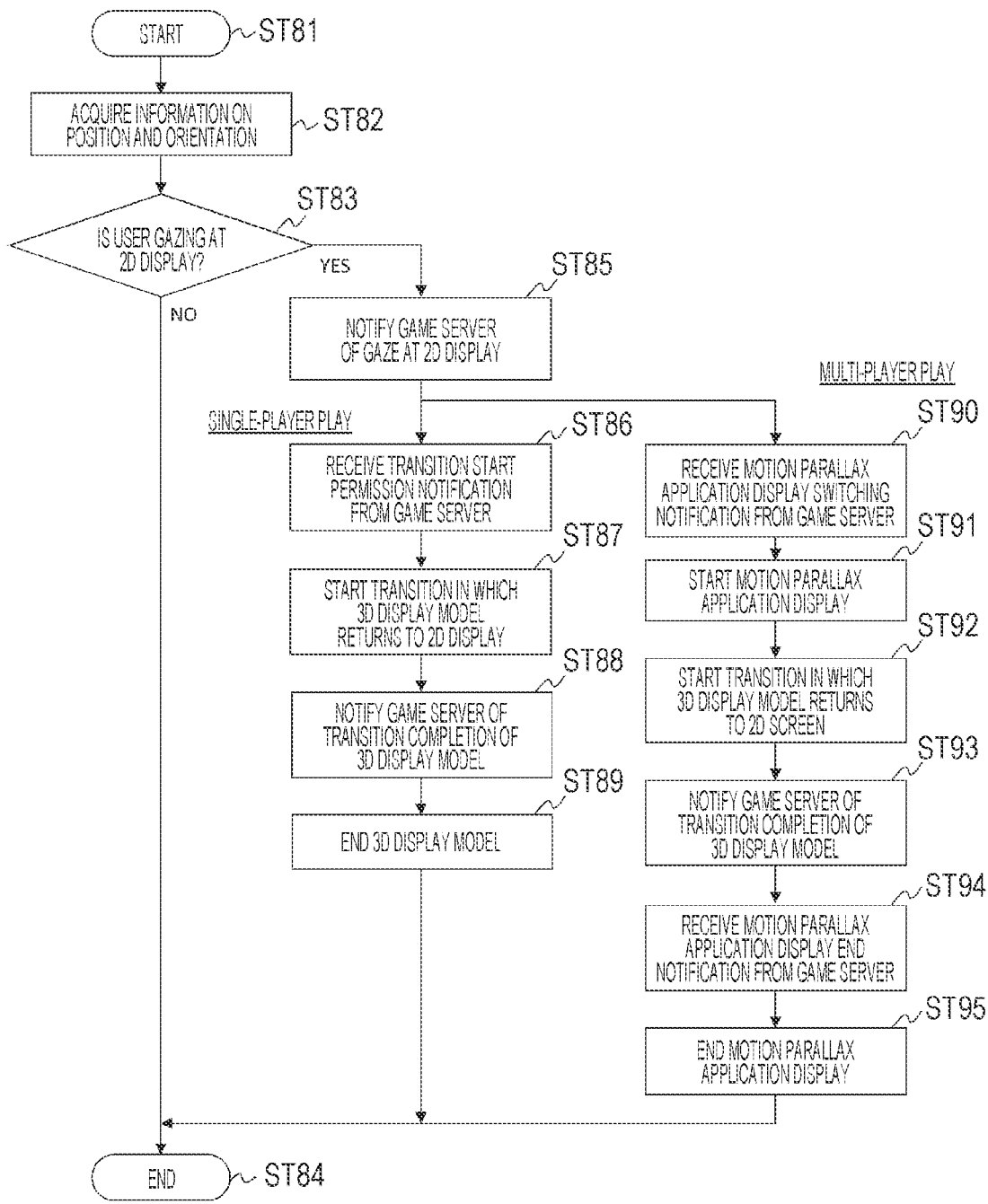
FIG. 16 is a flowchart illustrating an example of a processing procedure of the AR display device in a case where transition from the three-dimensional display model to the predetermined object of the two-dimensional content is performed.

The flowchart of FIG. 16 illustrates an example of a processing procedure of the AR display device 300 in a case where the transition from the three-dimensional display model to the predetermined object of the two-dimensional content is performed. The AR display device 300 repeatedly performs the processing of the flowchart of FIG. 16.

In step ST81, the AR display device 300 starts the processing, for example, at the timing of the start of the game. Next, in step ST82, the AR display device 300 acquires position and orientation information. In this case, information on the line-of-sight of the user may be further acquired. Next, in step ST83, the AR display device 300 determines whether or not the user is gazing at the 2D display 200 on the basis of the information acquired in step 82. When determining that the user is not gazing at the 2D display 200, in step ST84, the AR display device 300 ends the processing.

Furthermore, when it is determined in step ST83 that the user is gazing at the 2D display 200, the AR display device 300 notifies the game server 100 of the gaze at the 2D display 200 in step ST85.

Next, in the case of the single-player play, in step ST86, the AR display device 300 receives a transition start permission notification from the game server 100. Next, in step ST87, the AR display device 300 starts a transition in which the three-dimensional display model returns to the 2D display 200. Next, in step ST88, the AR display device 300 notifies the game server 100 of the completion of the transition of the three-dimensional display model. Next, the AR display device 300 ends the three-dimensional display model. After the processing of step ST89, the AR display device 300 proceeds to step ST84 and ends the processing.

Furthermore, in the case of the multi-player play, in step ST90, the AR display device 300 receives a notification of the motion parallax application display switching from the game server 100. Next, in step ST91, the AR display device 300 starts the motion parallax application display. That is, the AR display device 300 starts displaying the two-dimensional content in which the motion parallax is enabled at the position of the 2D display 200.

Next, in step ST92, the AR display device 300 starts a transition in which the three-dimensional display model returns to a two-dimensional screen. Next, in step ST93, the AR display device 300 notifies the game server 100 of the completion of the transition of the three-dimensional display model. Next, in step ST94, the AR display device 300 receives a notification of the end of the motion parallax application display. Next, in step ST95, the AR display device 300 ends the motion parallax application display. After the processing of step ST95, the AR display device 300 proceeds to step ST84 and ends the processing.

Figure 17:
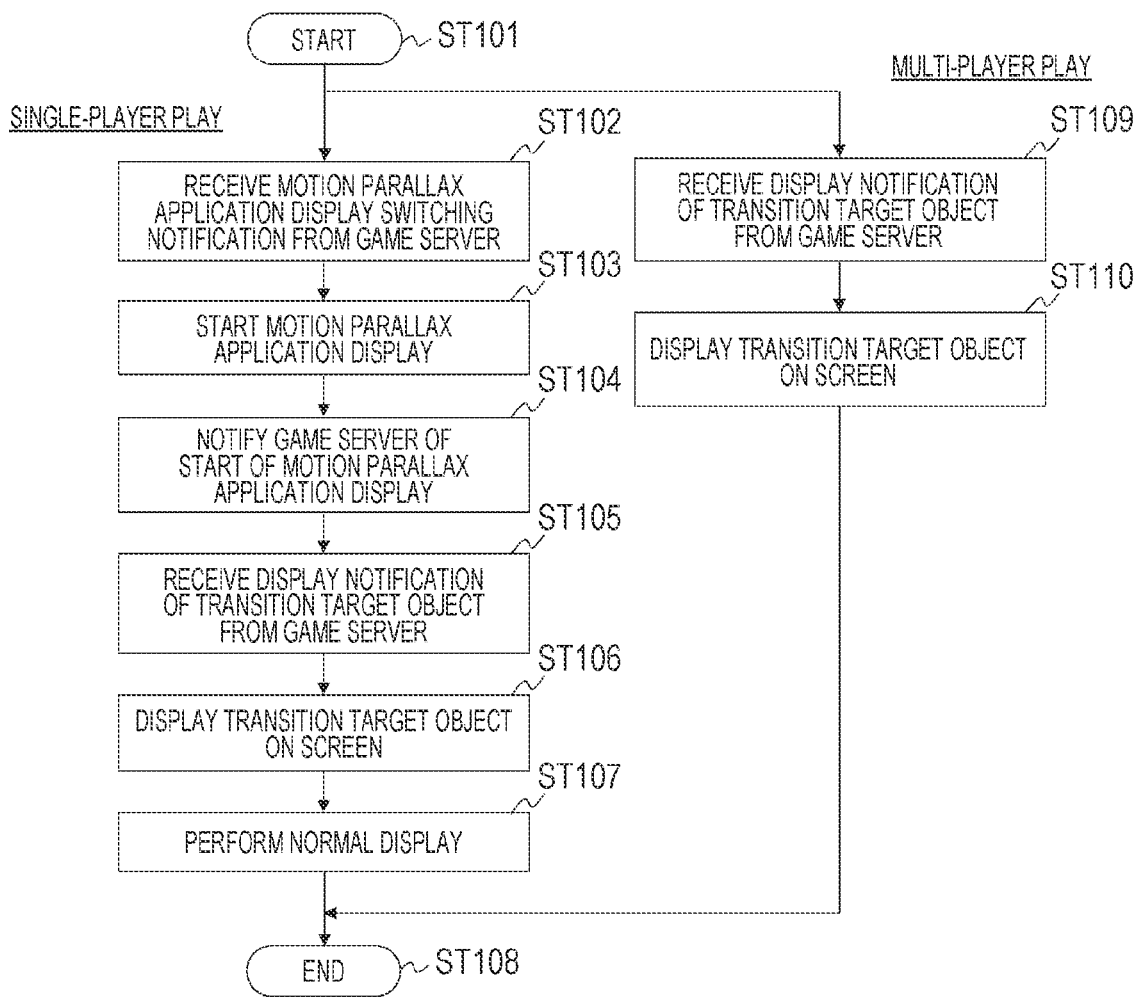
FIG. 17 is a flowchart illustrating an example of a processing procedure of the 2D display in a case where transition from the three-dimensional display model to the predetermined object of the two-dimensional content is performed, is.

The flowchart of FIG. 17 illustrates an example of a processing procedure of the 2D display 200 in a case where the transition from the three-dimensional display model to the predetermined object of the two-dimensional content is performed. The 2D display 200 repeatedly performs the processing of the flowchart of FIG. 17.

In step ST101, the 2D display 200 starts the processing, for example, at the game start timing.

Next, in the case of the single-player play, in step ST102, the 2D display 200 receives a notification of switching of the motion parallax application display from the game server 100. Next, in step ST103, the 2D display 200 starts the motion parallax application display. Next, in step ST104, the 2D display 200 notifies the game server 100 of the start of the motion parallax application display.

Next, in step ST105, the 2D display 200 receives a display notification of the transition target object from the game server 100. Next, in step ST106, the 2D display 200 displays the transition target object on the screen (the display screen of the two-dimensional content). Next, the 2D display 200 performs normal display, that is, motion parallax non-application display (motion parallax absence display). After the processing of step ST107, the 2D display 200 proceeds to step ST108 and ends the processing.

Furthermore, in a case where it is the multi-player play, in step ST109, the 2D display 200 receives a display notification of the transition target object from the game server 100. Next, in step ST110, the 2D display 200 displays the transition target object on the screen (the display screen of the two-dimensional content). After the processing of step ST110, the 2D display 200 proceeds to step ST108 and ends the processing.

As described above, in the game system 10 illustrated in FIG. 1, in a case where a predetermined object of two-dimensional content displayed on the two-dimensional display 200 is caused to transition as a three-dimensional display model of the AR display device 300, or in a case where the three-dimensional display model of the AR display device 300 is caused to transition as the predetermined object of the two-dimensional content displayed on the two-dimensional display 200, the transition is performed after the two-dimensional content is switched from motion parallax non-application display (motion parallax absence display) to motion parallax application display (motion parallax presence display). Therefore, it is possible to achieve natural appearance at the time of transition.

Furthermore, in the game system 10 illustrated in FIG. 1, in a case where there is one AR display device 300, that is, in a case of single-player play, the motion parallax application display is displayed on the two-dimensional display. Therefore, it is possible to more naturally show that a predetermined object on the two-dimensional display 200 pops out as a three-dimensional display model or that the three-dimensional display model returns as a predetermined object on the two-dimensional display 200.

Furthermore, in the game system 10 illustrated in FIG. 1, in a case where there is a plurality of AR display devices 300, that is, in a case of multi-player play, the motion parallax application display is displayed on the AR display device 300. Therefore, since the motion parallax application display matching the position of each AR display device 300 is performed, it is possible to show natural transitions in all the AR display devices 300 to the user.

2. Modification

Note that, in the above-described embodiment, the game system 10 includes the game server 100, the 2D display 200, and the AR display device 300, but a configuration in which the function of the game server 100 is provided to the 2D display 200 or the AR display device 300 and the game server 100 is not provided is also conceivable.

Furthermore, while preferred embodiments of the present disclosure have been described in detail with reference to the accompanying drawings, the technical scope of the present disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of the present disclosure.

Furthermore, the effects described in the present specification are merely illustrative or exemplary, and are not limitative. That is, the technique according to the present disclosure can exhibit other effects obvious to those skilled in the art from the description of the present specification together with the effects described above or instead of the effects described above.

Note that, the present technology can also adopt the following configuration.

(1) An information processing apparatus including a control unit configured to perform control such that, in a case where a predetermined object of two-dimensional content displayed on a two-dimensional display is caused to transition as a three-dimensional display model of an augmented reality display device, or in a case where the three-dimensional display model of the augmented reality display device is caused to transition as the predetermined object of the two-dimensional content displayed on the two-dimensional display, the transition is performed after the two-dimensional content is switched from motion parallax non-application display to motion parallax application display.

(2) The information processing apparatus according to (1), in which the control unit performs control such that the motion parallax application display is displayed on the two-dimensional display in a case where there is one augmented reality display device, and the motion parallax application display is displayed on the augmented reality display device in a case where there is a plurality of the augmented reality display devices.

(3) The information processing apparatus according to (1) or (2), in which the control unit performs control such that the transition is performed on the basis of information on a position and orientation of the augmented reality display device with respect to the two-dimensional display.

(4) The information processing apparatus according to (3), in which the control unit performs control such that the transition is performed when a distance between the two-dimensional display and the augmented reality display device is within a predetermined range.

(5) The information processing apparatus according to (4), in which the control unit performs control such that the transition is performed when the orientation of the augmented reality display device is within a predetermined range with respect to the two-dimensional display.

(6) The information processing apparatus according to (5), in which the control unit performs control such that the transition is performed when a line-of-sight of a user wearing the augmented reality display device faces the two-dimensional display.

(7) The information processing apparatus according to any one of (3) to (6), further including a communication unit that communicates with the two-dimensional display and the augmented reality display device, in which the control unit acquires user gaze information based on the information on the position and orientation from the augmented reality display device via the communication unit.

(8) The information processing apparatus according to any one of (1) to (7), in which, in a case where the predetermined object of the two-dimensional content is caused to transition as the three-dimensional display model, the control unit performs control such that the predetermined object is not displayed on the two-dimensional display after the transition and while the three-dimensional display model is displayed, or in a case where the three-dimensional display model is caused to transition as the predetermined object of the two-dimensional content, the control unit performs control such that the three-dimensional display model is not displayed on the augmented reality display device after the transition and while the predetermined object of the two-dimensional content is displayed.

(9) The information processing apparatus according to (8), in which the predetermined object of the two-dimensional content and the three-dimensional display model are content treated as the same object on an application executed by the control unit.

(10) The information processing apparatus according to any one of (1) to (9), in which the control unit is included in a cloud server connected to the two-dimensional display and the augmented reality display device via a network.

(11) The information processing apparatus according to (10), in which the cloud server is a game server.

(12) An information processing method including performing control such that, in a case where a predetermined object of two-dimensional content displayed on a two-dimensional display is caused to transition as a three-dimensional display model of an augmented reality display device, or in a case where the three-dimensional display model of the augmented reality display device is caused to transition as the predetermined object of the two-dimensional content displayed on the two-dimensional display, the transition is performed after the two-dimensional content is switched from motion parallax non-application display to motion parallax application display.

(13) A program causing a computer to function as control means configured to perform control such that, in a case where a predetermined object of two-dimensional content displayed on a two-dimensional display is caused to transition as a three-dimensional display model of an augmented reality display device, or in a case where the three-dimensional display model of the augmented reality display device is caused to transition as the predetermined object of the two-dimensional content displayed on the two-dimensional display, the transition is performed after the two-dimensional content is switched from motion parallax non-application display to motion parallax application display.

REFERENCE SIGNS LIST

10 Game system
100 Game server
101 Control unit
102 Communication unit
103 Storage unit
111 Communication control unit
112 Transition determination unit
113 State management unit
200 2D display
201 Control unit
202 Communication unit
203 Storage unit
204 Display
211 Communication control unit
212 Drawing processing unit
213 Display control unit
300 AR display device
301 Control unit
302 Communication unit
303 Sensor unit
304 Display unit
305 Storage unit
311 Communication control unit
312 Drawing processing unit
313 Display control unit
314 Input control unit
315 Recognition unit
316 Gaze point determination unit
501A Object
501B Three-dimensional display model

The invention claimed is:

1. An information processing apparatus, comprising:
a control unit configured to perform control such that, in a case where a predetermined object of two-dimensional content displayed on a two-dimensional display is caused to transition as a three-dimensional display model of an augmented reality display device, or in a case where the three-dimensional display model of the augmented reality display device is caused to transition as the predetermined object of the two-dimensional content displayed on the two-dimensional display, the transition is performed after the two-dimensional content is switched from motion parallax non-application display to motion parallax application display.

2. The information processing apparatus according to claim 1, wherein
the control unit is further configured to perform control such that the motion parallax application display is displayed on the two-dimensional display in a case where there is one augmented reality display device, and the motion parallax application display is displayed on the augmented reality display device in a case where there is a plurality of augmented reality display devices.

3. The information processing apparatus according to claim 1, wherein
the control unit is further configured to perform control such that the transition is performed based on information on a position and orientation of the augmented reality display device with respect to the two-dimensional display.

4. The information processing apparatus according to claim 3, wherein
the control unit is further configured to perform control such that the transition is performed when a distance between the two-dimensional display and the augmented reality display device is within a predetermined range.

5. The information processing apparatus according to claim 4, wherein
the control unit is further configured to perform control such that the transition is performed when the orientation of the augmented reality display device is within a predetermined range with respect to the two-dimensional display.

6. The information processing apparatus according to claim 5, wherein
the control unit is further configured to perform control such that the transition is performed when a line-of-sight of a user wearing the augmented reality display device faces the two-dimensional display.

7. The information processing apparatus according to claim 3, further comprising a communication unit configured to communicate with the two-dimensional display and the augmented reality display device, wherein
the control unit is further configured to acquire user gaze information based on the information on the position and orientation from the augmented reality display device via the communication unit.

8. The information processing apparatus according to claim 1, wherein, in a case where the predetermined object of the two-dimensional content is caused to transition as the three-dimensional display model,
the control unit is further configured to perform control such that the predetermined object is not displayed on the two-dimensional display after the transition and while the three-dimensional display model is displayed, or in a case where the three-dimensional display model is caused to transition as the predetermined object of the two-dimensional content, the control unit is further configured to perform control such that the three-dimensional display model is not displayed on the augmented reality display device after the transition and while the predetermined object of the two-dimensional content is displayed.

9. The information processing apparatus according to claim 8, wherein the predetermined object of the two-dimensional content and the three-dimensional display model are content treated as a same object on an application executed by the control unit.

10. The information processing apparatus according to claim 1,
wherein the control unit is included in a cloud server connected to the two-dimensional display and the augmented reality display device via a network.

11. The information processing apparatus according to claim 10,
wherein the cloud server is a game server.

12. An information processing method, comprising:
performing control such that, in a case where a predetermined object of two-dimensional content displayed on a two-dimensional display is caused to transition as a three-dimensional display model of an augmented reality display device, or in a case where the three-dimensional display model of the augmented reality display device is caused to transition as the predetermined object of the two-dimensional content displayed on the two-dimensional display, the transition is performed after the two-dimensional content is switched from motion parallax non-application display to motion parallax application display.

13. A non-transitory computer-readable medium having stored thereon computer-executable instructions that, when executed by a processor of an information processing apparatus, cause the processor to execute operations, the operations comprising:
performing control such that, in a case where a predetermined object of two-dimensional content displayed on a two-dimensional display is caused to transition as a three-dimensional display model of an augmented reality display device, or in a case where the three-dimensional display model of the augmented reality display device is caused to transition as the predetermined object of the two-dimensional content displayed on the two-dimensional display, the transition is performed after the two-dimensional content is switched from motion parallax non-application display to motion parallax application display.

* * * * *